United States Patent [19]

Opris

[11] Patent Number: 5,619,442
[45] Date of Patent: Apr. 8, 1997

[54] ALTERNATING POLARITY CARRY LOOK AHEAD ADDER CIRCUIT

[75] Inventor: Ion E. Opris, Stanford, Calif.

[73] Assignee: National Semiconductor Corporation, Santa Clara, Calif.

[21] Appl. No.: 418,829

[22] Filed: Apr. 7, 1995

[51] Int. Cl.⁶ ...................................................... G06F 7/50
[52] U.S. Cl. ............................................................ 364/787
[58] Field of Search .................................. 364/768, 784, 364/786, 787, 788

[56] References Cited

U.S. PATENT DOCUMENTS

| | | | |
|---|---|---|---|
| 3,700,875 | 10/1972 | Saenger et al. | 235/175 |
| 4,962,471 | 10/1990 | Cornelissen | 364/787 |
| 5,027,321 | 6/1991 | Knauer et al. | 364/788 |
| 5,047,974 | 9/1991 | Young | 364/787 |
| 5,117,386 | 5/1992 | Persoon et al. | 364/787 |
| 5,257,218 | 10/1993 | Poon | 364/787 |
| 5,278,783 | 1/1994 | Edmondson | 364/787 |
| 5,375,081 | 12/1994 | Anderson | 364/787 |
| 5,499,203 | 3/1996 | Grundland | 364/786 |

FOREIGN PATENT DOCUMENTS

| | | |
|---|---|---|
| 0442665 | 8/1991 | European Pat. Off. . |
| 0590251 | 4/1994 | European Pat. Off. . |

OTHER PUBLICATIONS

Electronics Letters, vol. 28, #5, Feb. 27, 1992, pp. 476–477 J. B. Kuo et al "BiCMOS Dynamic Manchester Carry Look Ahead Circuit for High Speed Arithmetic Unit VLSI".

Alan Y. Kwentus, Hing–Tsun Hung and Alan N. Willson, Jr., "An Architecture for High–Performance/Small–Area Multipliers for Use in Digital Filtering Applications" IEEE Journal of Solid–State Circuits, vol. 29, No. 2, Feb. 1994, pp. 117–121.

N.H.E. Weste and K. Eshraghian, "Principles of CMOS VLSI Design: A Systems Perspective" Addison–Wesley, 1994, pp. 526–536 and 622–623.

*Primary Examiner*—Chuong D. Ngo
*Attorney, Agent, or Firm*—Limbach & Limbach L.L.P.

[57] ABSTRACT

A carry look ahead circuit is implemented such that only one gate delay is incurred in calculating the carry output after the carry input becomes valid. The carry input and the carry output have opposite logical polarities. "Odd" carry look ahead stages are defined to have a positive logic carry input and a negative logic carry output, while "even" stages are defined to have a negative logic carry input and a positive logic carry output. Using "alternating polarity" in this manner simplifies the logic design of both odd and even stages. In a first embodiment, the generate and propagate computations are performed by a separate logic block. As the level of look ahead increases, the complexity of the generate and propagate block increases, but the remainder of the circuitry is unaffected. In a second embodiment, the generate and propagate signal computations are integrated into a complex gate which produces the carry output of each stage. In this manner, a reduction in the number of transistors used and circuit complexity is achieved over the first embodiment. Using more stages with less latency per stage reduces the total hardware required to accomplish a fixed latency. The minimum achievable propagation delay is reduced because the delay from carry input to carry output in each alternating polarity carry look ahead stage is less.

4 Claims, 10 Drawing Sheets

ALTERNATING POLARITY CARRY LOOK AHEAD ADDER CIRCUIT

BACKGROUND OF THE INVENTION

1. Field of the Invention

The present invention relates to binary adders for integrated circuits. Specifically, the present invention relates to carry look ahead adders in which propagation delay and hardware costs are minimized.

2. Discussion of the Related Art

FIG. 1 illustrates a standard ripple carry adder structure. The ripple carry adder takes two binary numbers, A and B, as inputs, and produces a single binary number, S, as output. In the example shown in FIG. 1, A, B, and S are each six bits in length. The ripple carry adder in FIG. 1 is made of six full adder cells 100. Although the ripple carry adder is implemented with a minimal amount of hardware, its propagation delay is relatively large. Each full adder 100 takes a carry input $C_{in}$ which is necessary to compute its sum output and carry output $C_{out}$. The amount of time necessary for the most significant bit $S_5$ of the output S and the carry output $C_6$ to become valid is constrained by the possibility of an asserted carry signal rippling through the row of adders from $C_0$ to $C_6$. If each full adder cell 100 requires a time $t_c$ to compute the $C_{out}$ output after the $C_{in}$ input has become valid, then the total propagation delay of the adder shown in FIG. 1 is $6*t_c$. Generally, the propagation delay is approximately $n*t_c$ for a ripple carry adder, where n is the number of full adders in the circuit. Therefore, the growth of the propagation delay of the ripple carry adder is a linear function of the number of bits in the addends.

The linear growth of a ripple carry adder's propagation delay is improved by calculating the carries to each stage in parallel with the sum computations for that stage. Carry look ahead is a technique for reducing the carry propagation delay by computing the output carry signal for several bits in parallel with the sum computations for those same bits. FIG. 2 shows the structure of a 6-bit carry look ahead adder. The 6-bit adder in FIG. 2 has two stages 200 and 201 of three-level look ahead circuits. Each three-level look ahead circuit 200 and 201 directly computes its $C_{out}$ output based upon the appropriate six bits of the addends—three bits from A and three bits from B—and its carry input $C_{in}$. A carry look ahead adder is typically designed so that the latency of the computation of $C_{out}$ after its $C_{in}$ input becomes valid has the same order of latency as each full adder cell 203. In this manner, the full adder cells 204 computing the more significant bits of the adder's output receive their carry inputs earlier than in a similar ripple carry adder so that the most latent outputs, $S_5$ and $C_6$, become valid with less latency.

In order to implement a carry look ahead circuit, the carry output $C_i$ from the $i^{th}$ level is written in terms of the necessary inputs required for its computation. The carry output from the $i^{th}$ level, $C_i$, can be expressed as follows.

$$C_i = G_i + P_i \cdot C_{i-1} \tag{1}$$

where $$G_i = A_i \cdot B_i \tag{2}$$

and $$P_i = A_i + B_i \tag{3}$$

Here, $G_i$ is the generate signal, which indicates that the addition of $A_i$ and $B_i$ will generate a carry output from the $i^{th}$ full adder. $P_i$ is the propagate signal, which indicates that any carry input to the $i^{th}$ full adder cell will be propagated to the carry output.

By recursive substitution, the carry output of the $i^{th}$ level, $C_i$, can be written as:

$$C_i = G_i + P_i \cdot G_{i-1} + P_i \cdot P_{i-1} \cdot G_{i-2} + \ldots + P_i \ldots P_1 \cdot C_0 \tag{4}$$

For three levels of look ahead, each carry look ahead circuit implements the following equation:

$$C_{out} = G_2 + P_2 \cdot G_1 + P_2 \cdot P_1 \cdot G_0 + P_2 \cdot P_1 \cdot P_0 \cdot C_{in} \tag{5}$$

There is a limit to the timing benefit which can be achieved by using a large carry look ahead circuits. When the number of levels of look ahead becomes too large, the number of inputs to the gates necessary to compute the outputs increases such that the delay through the carry look ahead circuit becomes disproportionately large. Thus, there is a limit to the speed improvement which can be achieved from the use of carry look ahead techniques.

The amount of hardware necessary to implement m stages of a k-level carry look ahead circuit is always less than the amount of hardware necessary to implement a single stage of k*m-level carry look ahead circuit. This inequality is a result of the fact that the complexity of the computation of $C_{out}$ increases polynomially as k increases. Therefore, the amount of hardware necessary to make a k-level carry look ahead circuit can clearly get out of hand when k becomes too large. As a result, the number of levels of look ahead is usually limited to about six.

One way to implement a carry look ahead circuit with very little delay through the critical path from carry in to carry out is the carry add select circuit. In the carry add select circuit, as shown in FIG. 3, two separate carry computation circuits 300 and 301 are used to speculatively calculate both possible carry outputs $C_{out0}$ and $C_{out1}$ based upon the two possible carry input values, zero or one. The advantage to this approach is that the speculative computations of the two possible carry outputs $C_{out0}$ and $C_{out1}$ begin before the carry input $C_{in}$ 302 has been computed by the preceding look ahead stage. When the preceding look ahead stage has computed its output, which is the carry input 302 of the present look ahead stage, the correct output 303 is selected from among the two speculatively computed possibilities. $C_{out0}$ and $C_{out1}$, by the multiplexor 304. Therefore, the propagation delay for the carry look ahead stage is merely the delay from the select input 305 to the output 303 of the multiplexor. Any given multiplexor implementation requires at least two logic levels; therefore, a minimum of two gate delays are required to implement a multiplexor. A multiplexor circuit employs either two inverting gates or two transmission gates. FIGS. 4A and 4B show two alternative implementations of the multiplexor 304 shown in FIG. 3. Either implementation has substantially larger delays than a single inverting gate.

For a k-bit carry look ahead adder circuit, the fundamental Equation 4 can be written in the following form.

$$C_k = G + P \cdot C_0 \tag{6}$$

where $$P = P_k \ldots P_1 \tag{7}$$

and $$G = G_k + P_k \cdot G_{k-1} + P_k \cdot P_{k-1} \cdot G_{k-2} + \ldots + P_k \ldots P_2 \cdot G_1 \tag{8}$$

$C_k$ is the carry output of the k-bit carry look ahead adder circuit, while $C_0$ is the carry input. Previous implementations of a carry look ahead circuit preserve the polarity from the carry input $C_0$, to the carry output $C_k$, as indicated in Equation 6. In other words, both the carry input $C_0$ and the carry output $C_k$ are represented using positive logic according to the prior art.

FIGS. 5A and 5B show typical logic circuits which performs the computation of $C_k$ from $C_0$, P, and G as described by Equation 6. Similar to the carry add select circuit, the typical logic circuit shown in FIGS. 5B attempt to minimize the delay from the input $C_0$ to the output $C_k$. Depending upon the number of levels of look ahead (k), the generation of P and G can become complex computations involving only k bits of A and k bits of B, but not involving carry information from previous stages. Therefore, the computations of P and G in any given carry look ahead stage begin immediately, and are designed so as to finish before $C_0$ becomes valid, so that the path from $C_0$ to $C_k$ is the critical path. The logic implementation shown in FIG. 5B clearly requires two gate delays.

SUMMARY OF THE INVENTION

According to the present invention, a carry look ahead circuit is implemented such that only one gate delay is incurred in calculating the carry output after the carry input becomes valid, rather than two gate delays as is required by the conventional structures in the prior art. The carry input and the carry output for a carry look ahead circuit according to the present invention have opposite logical polarities.

According to the present invention, "odd" carry look ahead stages are defined to have a positive logic carry input and a negative logic carry output, while "even" carry look ahead stages are defined to have a negative logic carry input and a positive logic carry output. Using "alternating polarity" in this manner simplifies the logic design of both odd and even stages.

According to a first embodiment of the present invention, the generate (G) and propagate (P) computations are performed by a separate logic block. As the level of look ahead increases, the complexity of the generate and propagate block increases, but the remainder of the circuitry is unaffected.

According to a second embodiment of the present invention, the generate and propagate signal computations are integrated into a complex gate which produces the carry output of each carry look ahead stage. In this manner, a reduction in the number of transistors used and circuit complexity can be achieved by implementing the propagate and generate logic directly into the carry look ahead circuit.

Several significant advantages are realized by the present invention. Using the present invention, less hardware is required to implement an adder circuit having a predetermined propagation delay than is required using prior art approaches. In comparing a conventional carry look ahead circuit to an alternating polarity carry look ahead circuit according to the present invention, a polynomial increase in hardware is greater than a linear decrease in the number of stages. Therefore, the total hardware according to the present invention is less than with conventional carry look ahead adders.

A second significant advantage of the present invention is that the minimum achievable propagation delay through an alternating polarity carry look ahead adder is less than with prior art carry look ahead adders. When minimizing the latency of the addition is the primary objective, a carry look ahead adder is designed so that the carry chain is the critical path. Because the delay from carry input to carry output in each alternating polarity carry look ahead stage is less than with conventional look ahead adder stages, the critical path of the overall adder will be correspondingly lower.

DETAILED DESCRIPTION OF THE INVENTION

Figure 1:
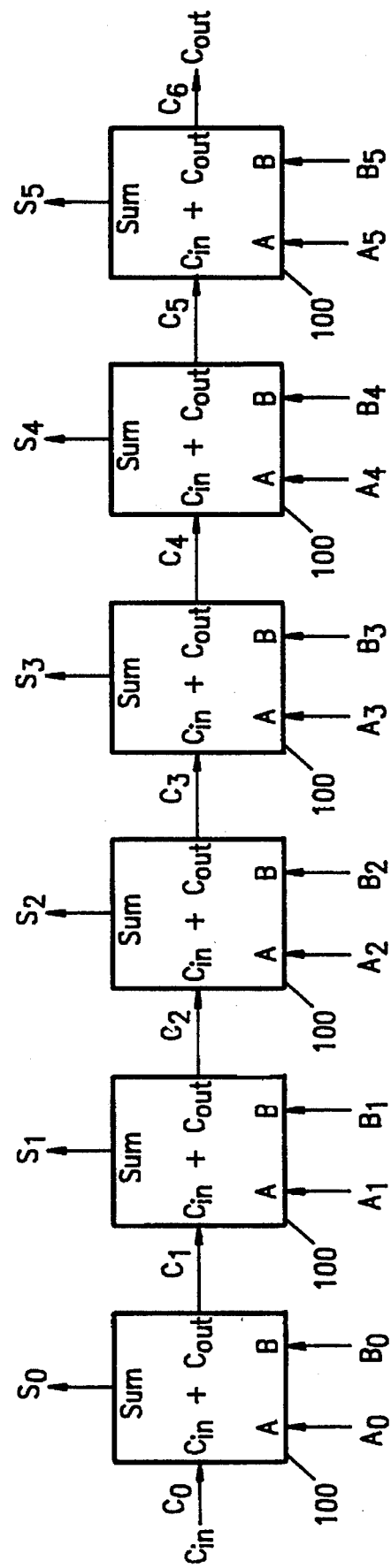
FIG. 1 illustrates a conventional 6-bit ripple carry binary adder.
Figure 2:
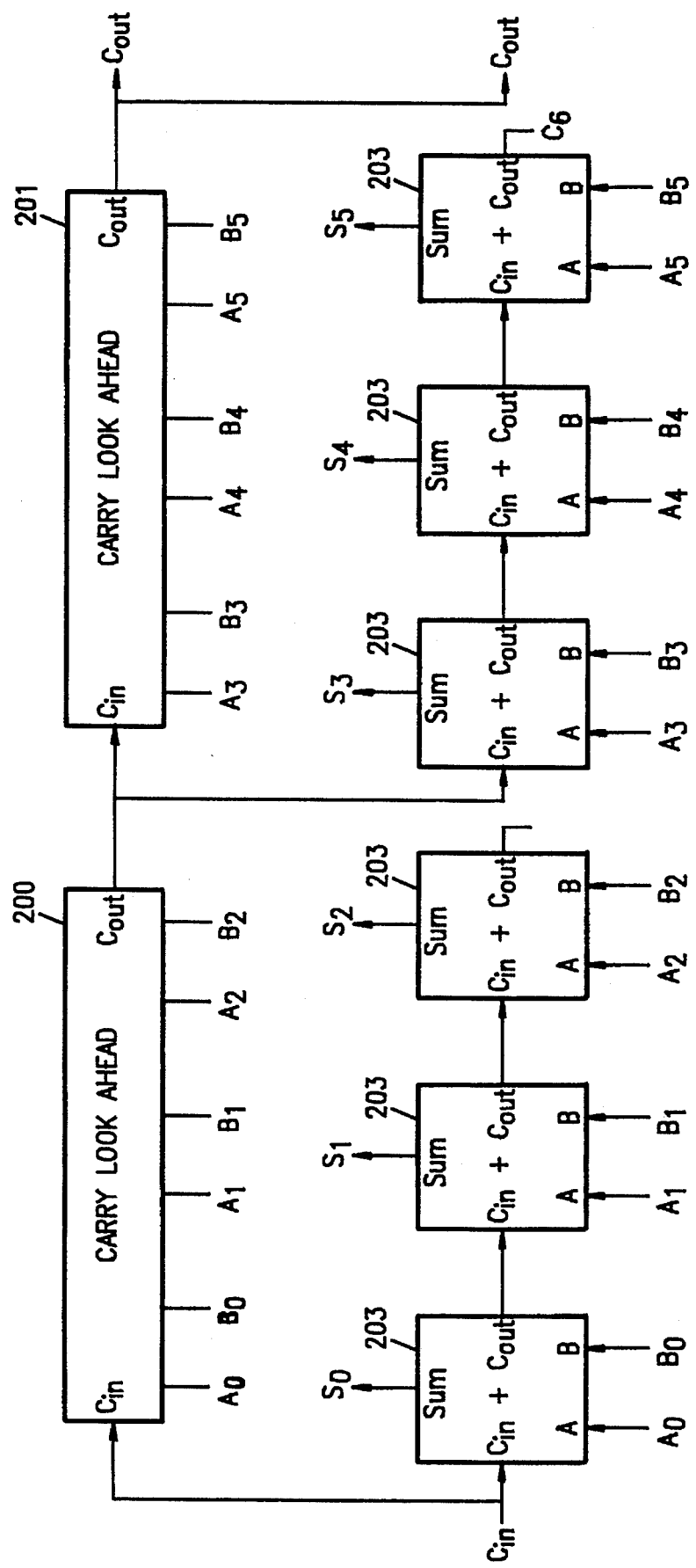
FIG. 2 illustrates a conventional 6-bit carry look ahead adder having two stages of three-level look ahead circuits.
Figure 3:
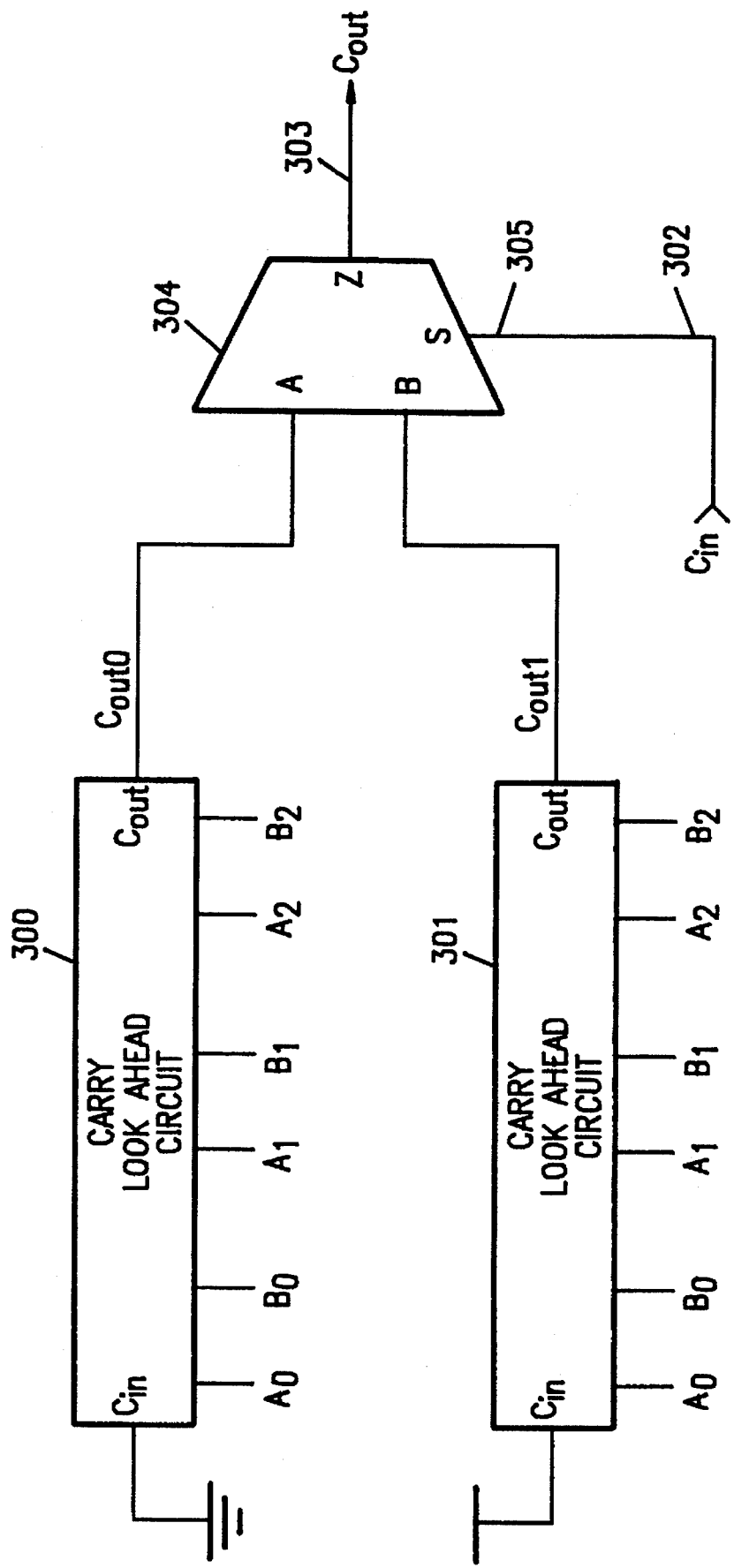
FIG. 3 illustrates a conventional carry add select implementation of carry look ahead circuit.
Figure 4A:
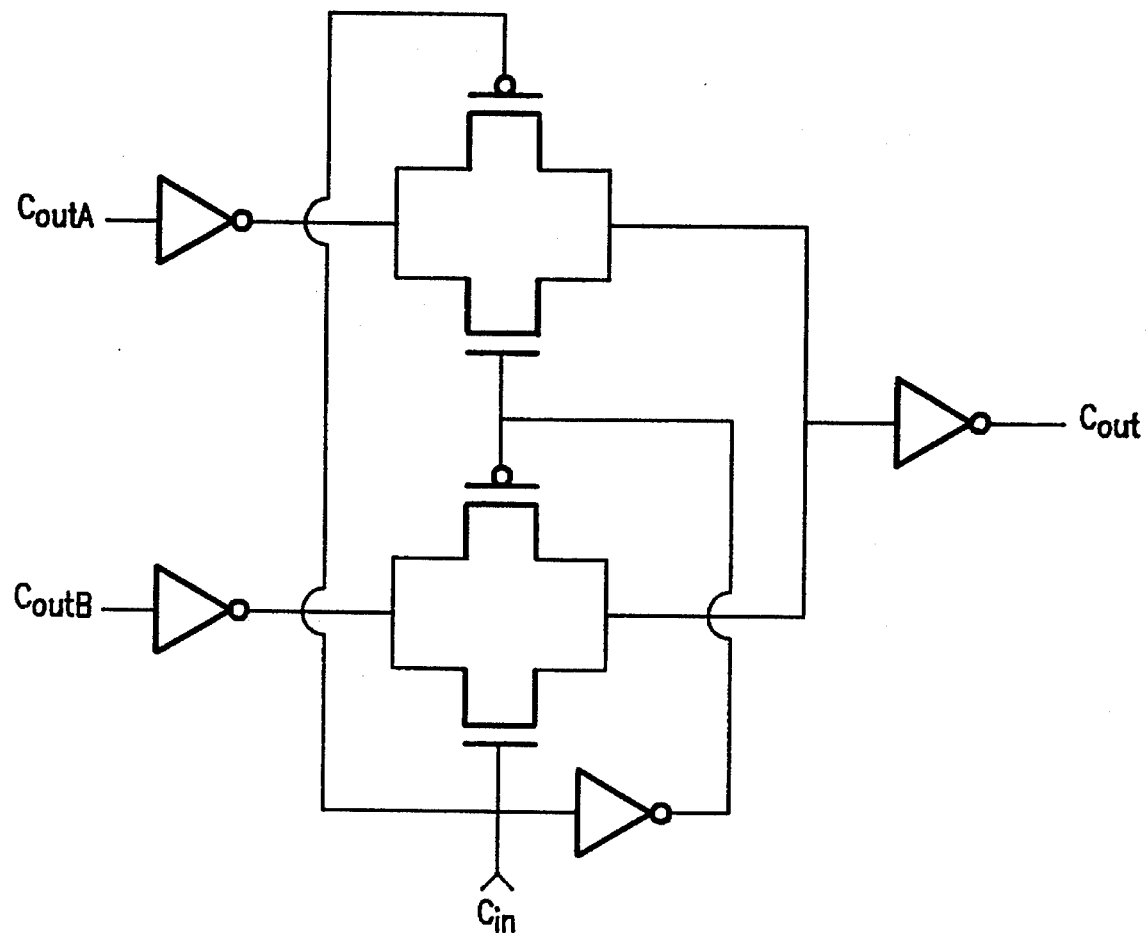
FIG. 4A illustrates a conventional CMOS transmission gate implementation of the multiplexor circuit shown in FIG. 3.
Figure 4B:
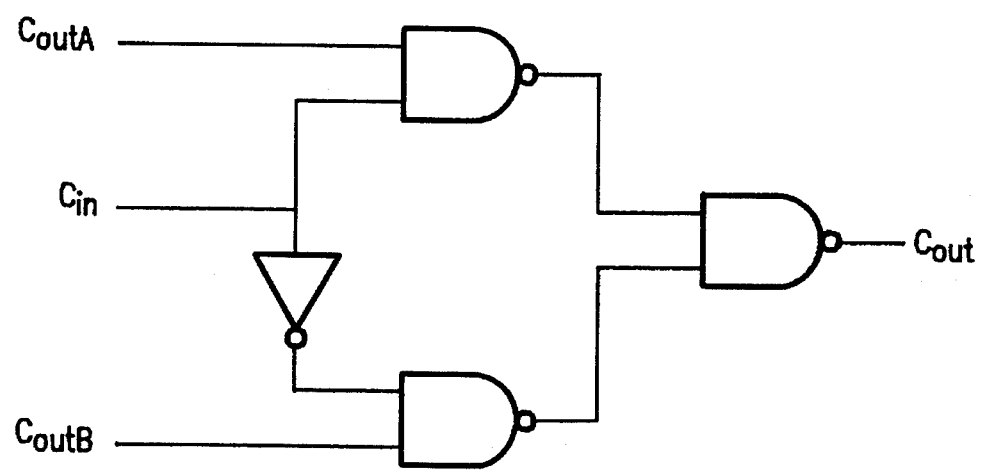
FIG. 4B illustrates another implementation of a multiplexor circuit as shown in FIG. 3.
Figure 5A:
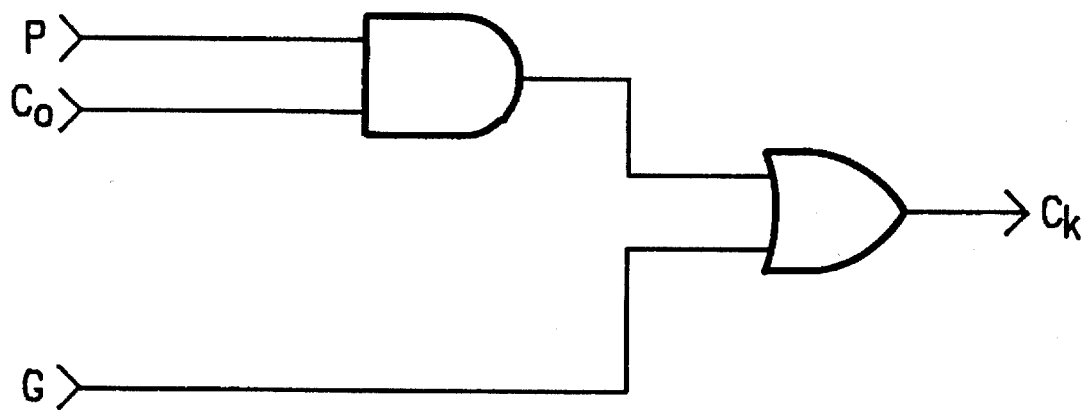
FIG. 5A illustrates one implementation of the logic in a conventional carry look ahead adder circuit's critical path.
Figure 5B:
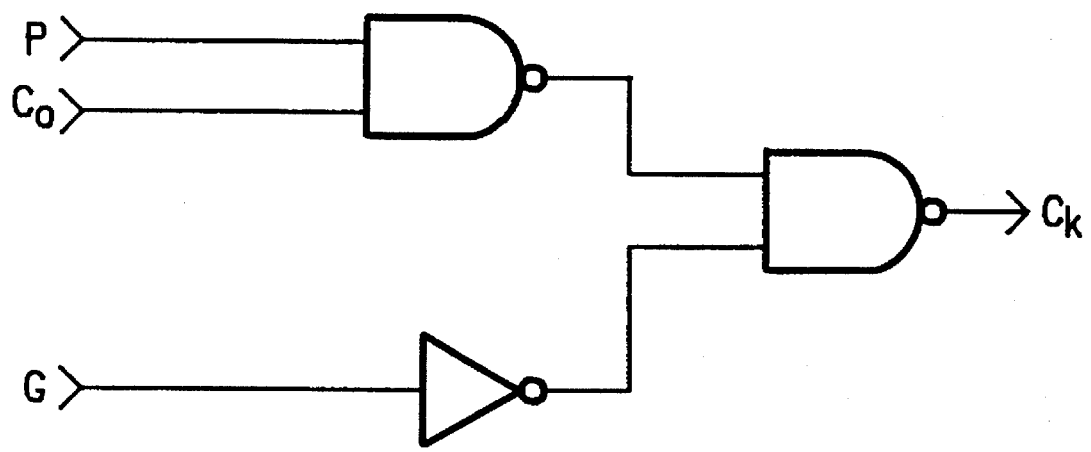
FIG. 5B illustrates a second possible implementation of a conventional carry look ahead adder circuit's critical path.

According to the present invention, a carry look ahead circuit is implemented such that only one gate delay is incurred in calculating the carry output $C_{out}$ after the carry input $C_{in}$ becomes valid, rather than two gate delays as is required by the conventional structures in the prior art. The fundamental difference between carry look ahead circuits according to the present invention and according to the prior art is that the carry input and the carry output for a carry look ahead circuit according to the present invention have opposite logical polarities, whereas prior art circuits maintain the same logical polarities for the carry input and carry output of each carry look ahead circuit. Carry look ahead circuits according to the present invention are therefore referred to as having alternating polarity.

The appropriate carry output $C_k$ from the $k^{th}$ full adder is directly computed by a k-level carry look ahead circuit according to the following equations.

$$C_k = G + P \cdot C_0 \qquad (9)$$

where $$P = P_k \ldots P_1 \qquad (10)$$

and $$G = G_k + P_k \cdot G_{k-1} + P_k \cdot P_{k-1} \cdot G_{k-2} + \ldots + P_k \ldots P_2 \cdot G_1 \qquad (11)$$

and $$G_i = A_i \cdot B_i \qquad (12)$$

and $$P_i = A_i + B_i \qquad (13)$$

Figure 6:
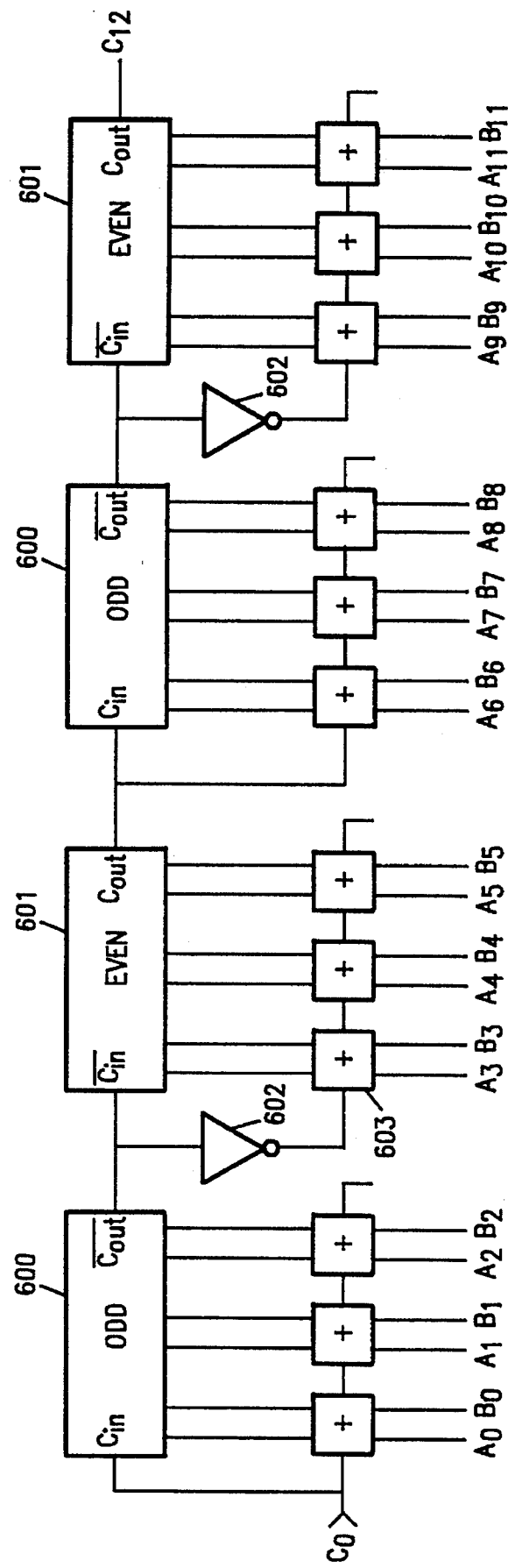
FIG. 6 illustrates a 12-bit carry look ahead adder using carry look ahead circuits according to the present invention.

According to the present invention, "odd" carry look ahead stages are defined to have a positive logic carry input and a negative logic carry output, while "even" carry look ahead stages are defined to have a negative logic carry input and a positive logic carry output. FIG. 6 shows how a series of alternating odd and even levels are linked together to form a lengthy carry look ahead adder circuit. In FIG. 6, the negative logic used on the output of each odd stage 600 is compensated by the negative logic used on the input of each even stage 601. Using alternating polarity in this manner simplifies the logic design of both the odd and the even carry look ahead stages. Because the output of each odd stage 600 has a negative logical polarity, an inverter 602 is used to invert the polarity of the /C$_{out}$ signal from the odd stage so that it can properly be input into the full adders 603.

Each carry look ahead circuit 600 and 601 has an output $C_k$ and a carry input $C_0$. The following equations represent the logic definitions for the carry input and the carry output of "odd" look ahead stages according to the present invention.

$$C_{out} = /C_k \qquad (14)$$

and $$C_{in} = C_0 \qquad (15)$$

The slash represents logical negation, and indicates that the output /C$_{out}$ is defined using negative logic. By substituting the above equations into Equation 9, the logic equation for odd stages of carry look ahead is derived.

$$/C_{out} = G + P \cdot C_{in} \qquad (16)$$

For these odd stages, the output /C$_{out}$ is asserted when zero and is deasserted when one, while the input C$_{in}$ is deasserted when one and deasserted when zero. Thus, the input C$_{in}$ is represented using positive logic, while the output /C$_{out}$ is represented using negative logic.

In order to compute the correct results, an even stage is used to compensate for each odd stage. The following equations represent the logic definitions for the input and output of even look ahead stages according to the present invention.

$$C_{out} = C_k \qquad (17)$$

and $$C_{in} = /C_0 \qquad (18)$$

The slash represents logical negation, and indicates that the input /C$_{in}$ is defined using negative logic. By substituting the above equations into Equation 9, the logic equation for even stages of carry look ahead is derived.

$$C_{out} = G + P \cdot /C_{in} \qquad (19)$$

For these even stages, the output C$_{out}$ is asserted when one and is deasserted when zero, while the input C$_{in}$ is asserted when zero and deasserted when one. Thus, the input /C$_{in}$ is represented using negative logic, while the output C$_{out}$ is represented using positive logic.

Figure 7B:
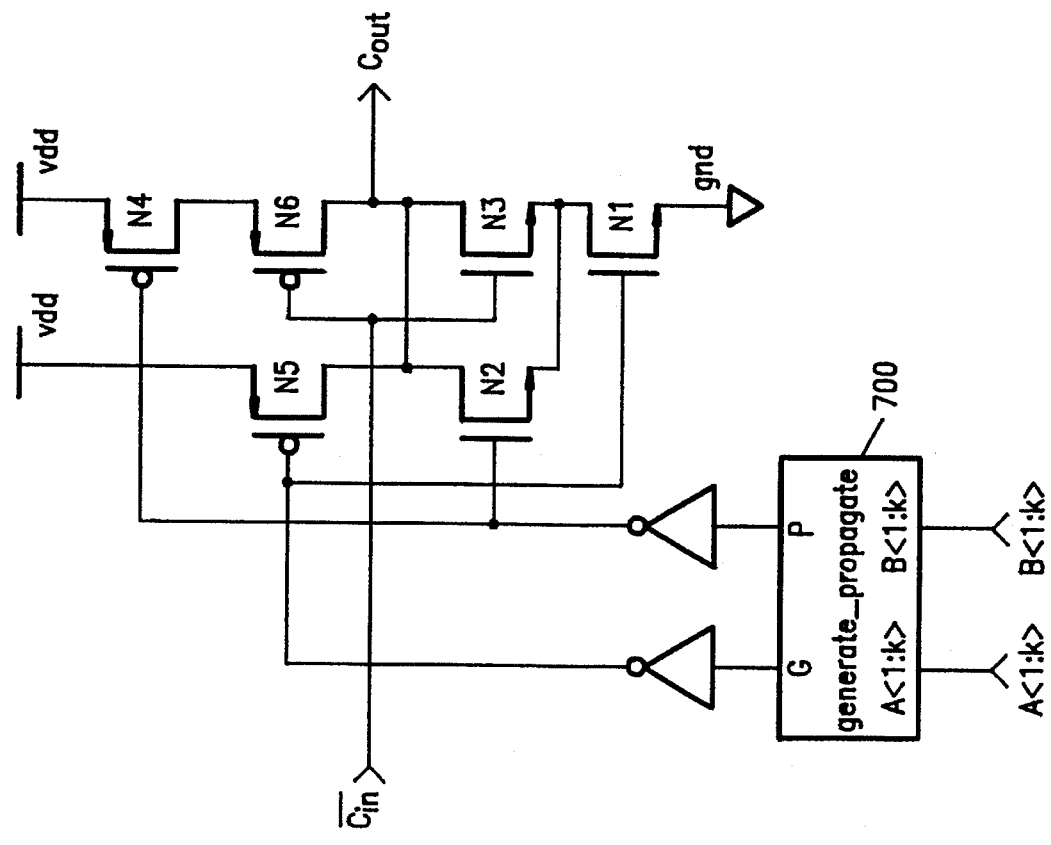
FIG. 7B illustrates a CMOS implementation of an even carry look ahead circuit stage according to a second embodiment of the present invention.
Figure 7A:
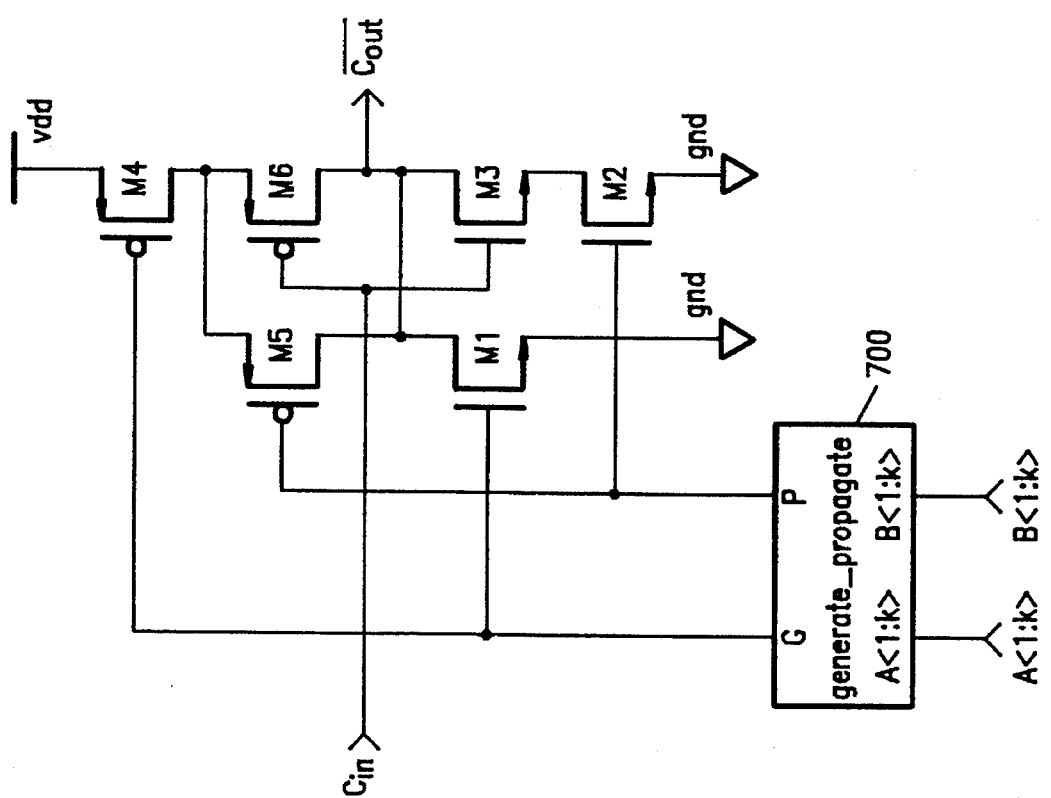
FIG. 7A illustrates a CMOS implementation of an odd carry look ahead circuit stage according to a first embodiment of the present invention.

According to a first embodiment of the present invention, the generate G and propagate P computations are performed by a separate logic block which ideally computes G and P prior to C$_0$ becoming valid. FIGS. 7A and 7B depict CMOS implementations of the odd and even stages according to the first embodiment of the present invention. FIGS. 7A and 7B implement Equations 16 and 19, respectively. In both FIGS. 7A and 7B, the generate-propagate blocks 700 perform the computations of the G and P terms defined by Equations 10 through 13 and used in Equations 16 and 19, respectively. Both these circuits in FIGS. 7A and 7B can be used for any level k of look ahead. As k increases, the complexity of the generate-propagate blocks 700 increases, but the remainder of the circuits shown in FIGS. 7A and 7B are unaffected. Therefore, the first embodiment as depicted in FIGS. 7A and 7B is applicable for any level k of look ahead.

The circuit in FIG. 7A according to the present invention does not incur an inversion in producing its output /C$_{out}$. From C$_{in}$ to /C$_{out}$, therefore only a single gate delay is incurred. This reduces the length of the critical path from C$_{in}$ to /C$_{out}$ by nearly a factor of two over the prior art equivalent path from C$_{in}$ to C$_{out}$.

The circuit shown in FIG. 7B illustrates a CMOS implementation of an even stage. The even stage also has only a single gate delay from input /C$_{in}$ to output C$_{out}$. Fundamentally, the structure of the even stage is very similar to the structure of the odd stage; by interchanging V$_{dd}$ and ground, interchanging P-channel and N-channel devices, and inverting the polarities of all inputs and outputs, the odd stage shown in FIG. 7A is transformed into the even stage shown in FIG. 7B.

Figure 8A:
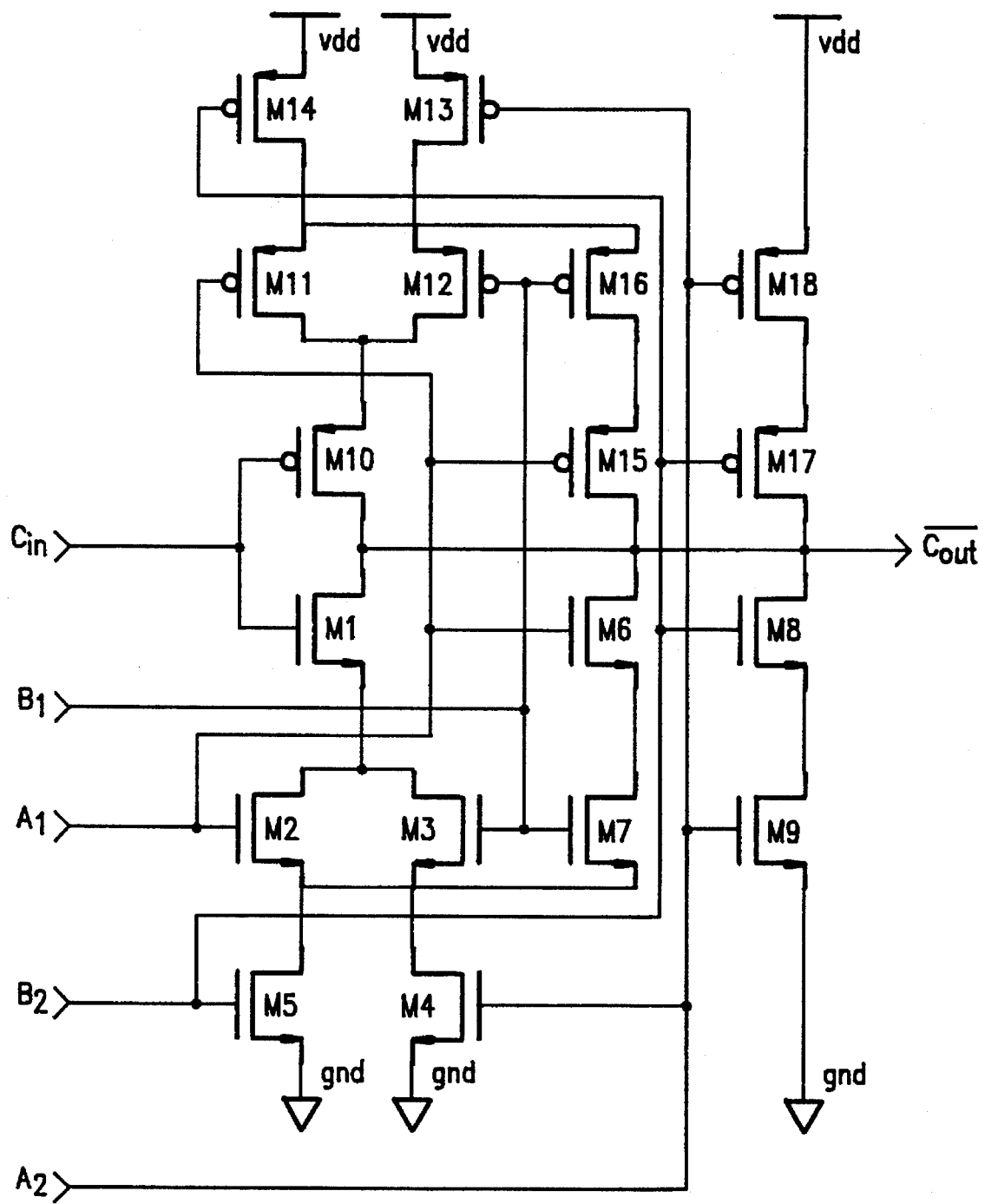
FIG. 8A illustrates a CMOS implementation of an odd 2-level carry look ahead circuit stage according to a second embodiment of the present invention.
Figure 8B:
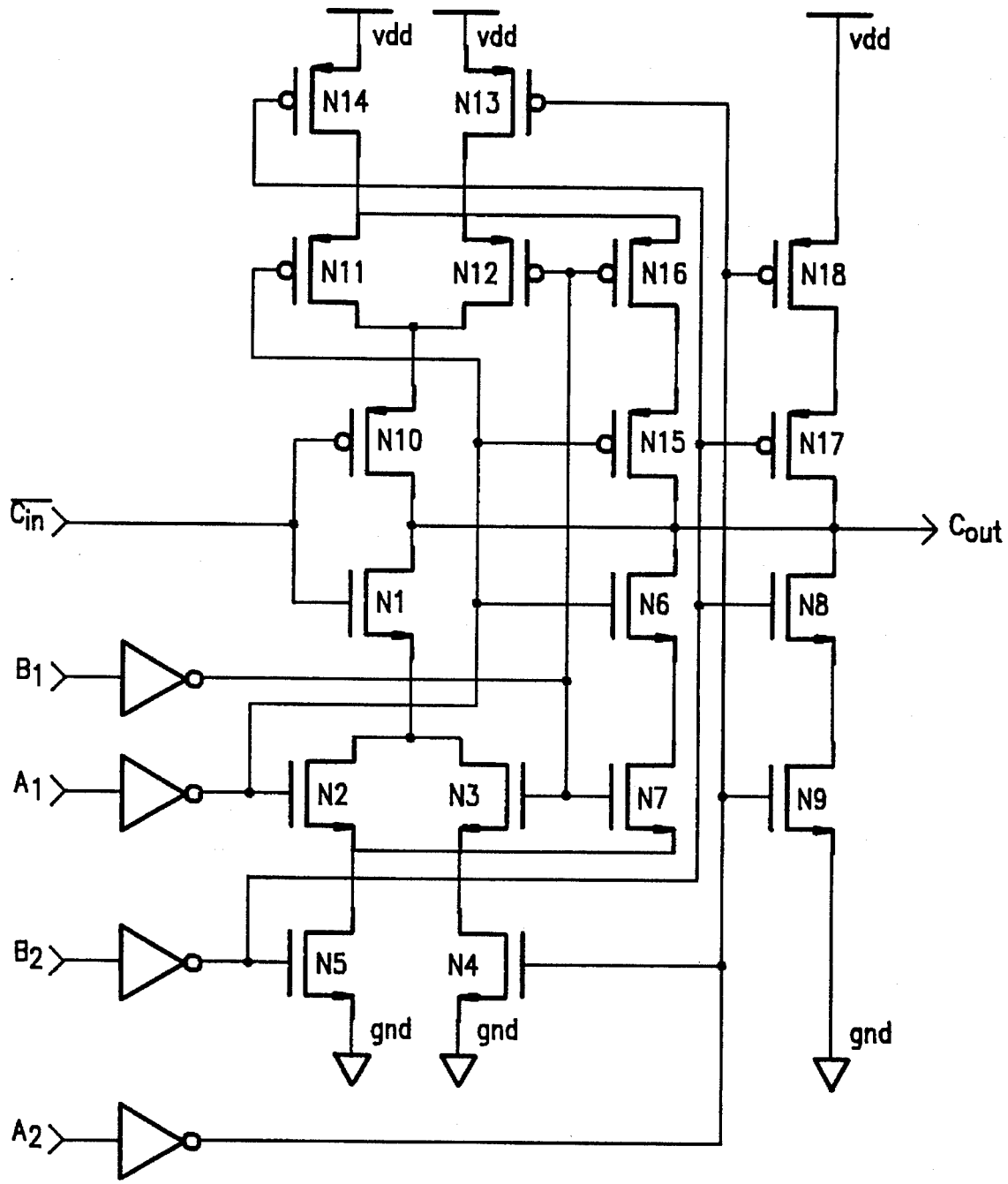
FIG. 8B illustrates a CMOS implementation of an even 2-level carry look ahead circuit stage according to a second embodiment of the present invention.

According to a second embodiment of the present invention, the generate and propagate signal computations are integrated into the complex gate which produces the carry output of each carry look ahead stage. FIGS. 8A and 8B show optimized CMOS circuits implementing 2-level alternating polarity carry look ahead adder stages according to this second embodiment of the present invention. In these circuits, the generate and propagate signal computations are integrated into one complex gate which performs the C$_{out}$ computation. In this manner, a reduction in the number of transistors used and circuit complexity can be achieved by implementing the propagate and generate logic directly into the carry look ahead circuit.

As an application, a 2-bit alternating polarity carry look ahead circuit was designed. The logic function implemented by the 2-bit carry look ahead odd stage, shown in FIG. 8A, is as follows.

$$/C_{out} = /\{A_2 \cdot B_2 + (A_2 + B_2) \cdot [A_1 \cdot B_1 + (A_1 + B_1) \cdot C_{in}]\} \qquad (20)$$

which is equivalent to equation 19 for a 2-bit carry look ahead adder. For the even stage, the logic equation can be expressed as the following.

$$C_{out} = /\{/A_2 \cdot /B_2 + (/A_2 + /B_2) \cdot [/A_1 \cdot /B_1 + (/A_1 + /B_1) \cdot /C_{in}]\} \qquad (21)$$

Equation 21 has the same structure as equation 20, with inverted data inputs. The corresponding implementation is shown in FIG. 8B, and indeed is the same structure as FIG. 8A. A 16-bit parallel adder using 8 stages of this alternating polarity 2-level carry look ahead circuit implementation had approximately the same propagation delay as 4 stages of 4-level conventional carry look ahead, but with a substantial reduction in circuit complexity. This same strategy can be applied to levels of look ahead greater than 2 using similar derivations, but are omitted from discussion for the sake of brevity.

Several significant advantages are realized by the present invention. Using the present invention, less hardware is required to implement an adder circuit having a predetermined propagation delay than is required using prior art approaches. The present invention eliminates an inverter from each stage; however, the bulk of the savings occurs in the generate and propagate computations. The critical path of any properly designed adder is through the carry chain. Normally, the number of levels of look ahead, k, is increased in order to reduce the propagation delay through the critical path. However, the amount of hardware necessary to implement the generate (G) and propagate (P) signals (700 in FIGS. 7A and 7B) for each carry look ahead circuit increases polynomially as k is increased. Using the described implementations, a k-level carry look ahead circuit according to the present invention will have roughly half the delay as a conventional prior art k-level carry look ahead circuit.

In a conventional carry look ahead adder designed such that two 16-bit binary numbers are added together using 4 levels of 4-stage carry look ahead, the resulting propagation delay is t, for example. In order to meet the same speed requirement (propagation delay of t), 8 levels of alternating polarity 2-level carry look ahead can be used, because the alternating polarity carry look ahead circuits have approximately half the delay as conventional carry look ahead circuits. Although the speed performance is the same, the hardware required to implement 8 levels of alternating polarity 2-level carry look ahead is significantly less than 4 stages of conventional 4-level carry look ahead. This is a consequence of the fact that the complexity of the computations of the generate (G) and propagate (P) signals for each carry look ahead stage are polynomially related to the number of look ahead levels, k. The total hardware for the carry look ahead circuit is equal to the hardware per stage multiplied by the number of stages. In comparing a conventional carry look ahead circuit to an alternating polarity carry look ahead circuit according to the present invention, a polynomial increase in hardware is greater than a linear decrease in the number of stages. Therefore, the total generate and propagate hardware according to the present invention is less than according to conventional carry look ahead adders.

Figure 9:
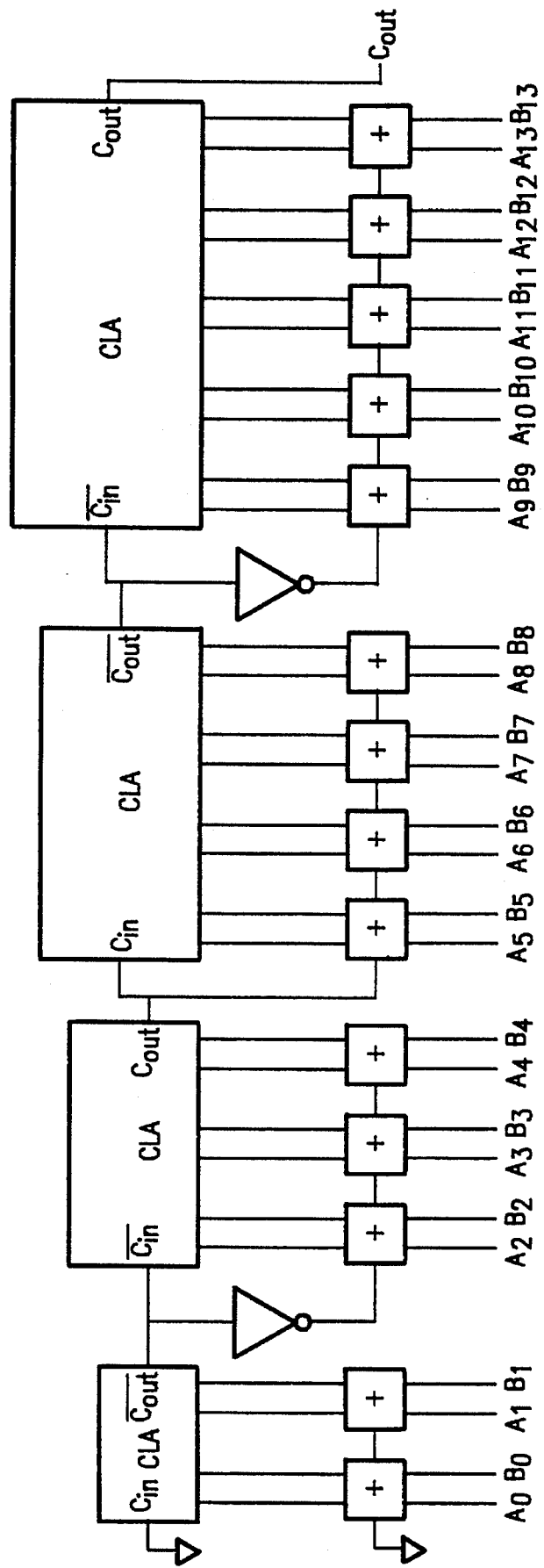
FIG. 9 illustrates one possible partitioning of a carry look ahead adder using carry look ahead circuits according to the present invention in which the adder is structured so as to be optimized for minimum propagation delay.

A second significant advantage of the present invention is that the minimum achievable propagation delay through an alternating polarity carry look ahead adder is less than with prior art carry look ahead adders. When minimizing the latency of the addition is the primary objective, a carry look ahead adder is designed so that the carry chain is the critical path. As depicted in FIG. 9, the number of levels of look ahead can be designed so as to increase with each successive stage. This allows the computations of the generate and propagate signals for each stage to have a longer time in which to be computed before the carry input, which is propagating through the carry look ahead chain, becomes valid. Thus, the level of look ahead for each stage can be fashioned so as to be dependent upon the propagation delay through the carry chain prior to that particular stage. The level of look ahead for each stage is chosen so that the generate and propagate signals for that stage become valid just prior to the carry input for that stage becoming valid. Because the delay from carry input to carry output in each alternating polarity carry look ahead stage is less than with conventional look ahead adder stages, the critical path of the overall adder will be correspondingly lower by as much as a factor of two.

There are many obvious equivalents of the embodiments depicted. For example, the exact structures shown in FIGS. 7A, 7B, 8A, and 8B can be modified substantially without departing from the spirit and scope of the invention. Transistors M2 and M3 in FIG. 7A can be interchanged, for example. Transistors M4 and the pair M5 and M6 can be interchanged. Similarly, transistors N1 and the pair N2 and N3 can be interchanged in FIG. 7B. Transistors N4 and N6 can be interchanged. In reference to FIGS. 8A and 8B, a much larger number of equivalents exist which take advantage of the fact that the exact order of two or more transistors in series is not critical. Although it is impractical to explicitly claim each of these numerous equivalents, they are intended to be covered by the appended claims.

However, the preferred embodiments of the present invention, as depicted in FIGS. 7A, 7B, 8A, and 8B, demonstrate that some of the equivalents mentioned in the preceding paragraph are preferrable over others. The critical path through a properly designed carry look ahead circuit is from the carry input to the carry output. Therefore, the transistors having gates connected to the carry input should have drains directly connected to the carry output node so that these critical transistors are at the end of their respective pull-up or pull-down chains. It is not preferrable to place these critical transistors in the middle of a pull-up or pull-down chain of series transistors, because these critical transistors are the last to remain active—i.e., the last to switch conduction states. These critical transistors are transistors M6 and M3 in FIG. 7A, transistors N6 and N3 in FIG. 7B, transistors M10 and M1 in FIG. 8A, and transistors N10 and N1 in FIG. 8B. By connecting these critical transistors at the end of any pull-up or pull-down series of transistors and directly connecting them to the output node, the bulk effect conduction reduction is eliminated. If the critical transistors are not directly connected to the output node, then they may be required to charge or discharge the sources and drains of other transistors before reaching the output node. By connecting the critical transistors directly to the output as in the preferred embodiments, this charging or discharging is preliminarily performed before the critical carry input arrival. If these critical transistors are connected directly to the output, then the charges on their sources can be transferred to the output through a lower resistance path (one transistor), rather than through two or more series transistors in the less-preferred alternative. Thus, the preferred embodiments reduce the time required for the output to become valid as compared to those equivalents which do not connect the critical transistors to the output node.

Furthermore, the terms "odd" and "even" are arbitrarily assigned so that odd refers to positive logic input, while even refers to negative logic input. These labels can be reversed without departing from the spirit and scope of the present invention. Additionally, the CMOS structures shown in FIGS. 7A, 7B, 8A, and 8B and their equivalents could easily be transformed into NMOS or domino CMOS circuits without departing from the spirit and scope of the present invention.

While the present invention has been disclosed above with particular reference to the preferred embodiments shown, those embodiments are presented by way of example, not by way of limitation. Those of ordinary skill in the art would be enabled by this disclosure to add to or modify these embodiments of the invention in various ways as needed and still be within the scope and spirit of the present invention as recited in the appended claims.

What is claimed is:

1. An apparatus that performs carry look ahead computations in a binary adder, the apparatus comprising:

a carry input terminal that receives a carry input signal having a first logical polarity;

a first plurality of addend input terminals that receive a first plurality of addend bits having the first logical polarity;

a second plurality of addend input terminals that receive a second plurality of addend bits having the first logical polarity;

an output terminal that supplies a carry output signal having a second logical polarity; and a logic gate taking the carry input signal and the first and second pluralities of addend bits as inputs and directly computing the carry output signal, such that the carry output signal is asserted when an arithmetic addition of the first and second pluralities of addend bits and the carry input signal produces a resulting sum requiring one more bit in order to represent the resulting sum than is present in either the first or second pluralities of addend bits;

wherein the first plurality of addend input terminals includes a first low order input terminal and a first high order input terminal;

wherein the first plurality of addend bits includes a first low order input signal and a first high order input signal;

wherein the second plurality of addend input terminals includes a second low order input terminal and a second high order input terminal;

wherein the second plurality of addend bits includes a second low order input signal and a second high order input signal; and wherein the logic gate comprises:

a first n-channel transistor having a first source, a first drain, and a first gate;

a second n-channel transistor having a second source, a second drain, and a second gate;

a third n-channel transistor having a third source, a third drain, and a third gate;

a fourth n-channel transistor having a fourth source, a fourth drain, and a fourth gate;

a fifth n-channel transistor having a fifth source, a fifth drain, and a fifth gate;

a sixth n-channel transistor having a sixth source, a sixth drain, and a sixth gate;

a seventh n-channel transistor having a seventh source, a seventh drain, and a seventh gate;

an eighth n-channel transistor having an eighth source, an eighth drain, and an eighth gate; and a ninth n-channel transistor having a ninth source, a ninth drain, and a ninth gate;

wherein the first source is connected to the second drain, the first drain is connected to the output terminal, and the first gate is connected to the carry input terminal;

wherein the second source is connected to the fifth drain, the second drain is connected to the first source, and the second gate is connected to the first low order input terminal;

wherein the third source is connected to the fourth drain, the third drain is connected to the first source, and the third gate is connected to the second low order input terminal;

wherein the fourth source is connected to a low supply voltage, the fourth drain is connected to the third source, and the fourth gate is connected to the first high order input terminal;

wherein the fifth source is connected to the low supply voltage, the fifth drain is connected to the second source, and the fifth gate is connected to the second high order input terminal;

wherein the sixth source is connected to the seventh drain, the sixth drain is connected to the output terminal, and the sixth gate is connected to the first low order input terminal;

wherein the seventh source is connected to the fifth drain, the seventh drain is connected to the sixth source, and the seventh gate is connected to the second low order input terminal;

wherein the eighth source is connected to the ninth drain, the eighth drain is connected to the output terminal, and the eighth gate is connected to the second high order input terminal; and wherein the ninth source is connected to the low supply voltage, the ninth drain is connected to the eighth source, and the ninth gate is connected to the first high order input terminal.

2. An apparatus as in claim 1, wherein the logic gate further comprises:

a first p-channel transistor having a tenth source, a tenth drain, and a tenth gate;

a second p-channel transistor having an eleventh source, an eleventh drain, and an eleventh gate;

a third p-channel transistor having a twelfth source, a twelfth drain, and a twelfth gate;

a fourth p-channel transistor having a thirteenth source, a thirteenth drain, and a thirteenth gate;

a fifth p-channel transistor having a fourteenth source, a fourteenth drain, and a fourteenth gate;

a sixth p-channel transistor having a fifteenth source, a fifteenth drain, and a fifteenth gate;

a seventh p-channel transistor having a sixteenth source, a sixteenth drain, and a sixteenth gate;

an eighth p-channel transistor having a seventeenth source, a seventeenth drain, and a seventeenth gate; and a ninth p-channel transistor having an eighteenth source, an eighteenth drain, and an eighteenth gate;

wherein the tenth source is connected to the eleventh drain, the tenth drain is connected to the output terminal, and the tenth gate is connected to the carry input terminal;

wherein the eleventh source is connected to the fourteenth drain, the eleventh drain is connected to the tenth source, and the eleventh gate is connected to the first low order input terminal;

wherein the twelfth source is connected to the thirteenth drain, the twelfth drain is connected to the tenth source, and the twelfth gate is connected to the second low order input terminal;

wherein the thirteenth source is connected to a high supply voltage, the thirteenth drain is connected to the twelfth source, and the thirteenth gate is connected to the first high order input terminal;

wherein the fourteenth source is connected to the high supply voltage, the fourteenth drain is connected to the eleventh source, and the fourteenth gate is connected to the second high order input terminal;

wherein the fifteenth source is connected to the sixteenth drain, the fifteenth drain is connected to the output terminal, and the fifteenth gate is connected to the first low order input terminal;

wherein the sixteenth source is connected to the thirteenth drain, the sixteenth drain is connected to the fifteenth source, and the sixteenth gate is connected to the second low order input terminal;

wherein the seventeenth source is connected to the ninth drain, the seventeenth drain is connected to the output terminal, and the seventeenth gate is connected to the second high order input terminal; and wherein the eighteenth source is connected to the high supply voltage, the eighteenth drain is connected to the seventeenth source, and the eighteenth gate is connected to the first high order input terminal.

3. An apparatus as in claim 2, wherein the first logical polarity is positive logic, the second logical polarity is negative logic.

4. An apparatus as in claim 2, wherein the first logical polarity is negative logic, the second logical polarity is positive logic.

\* \* \* \* \*